3,230,193
POLYURETHANES STABILIZED BY PHOSPHINES
Gordon M. Moulds and Robert E. Walck, Jr., Waynesboro, Va., assignors to E. I. du Pont de Nemours and Company, Wilmington, Del., a corporation of Delaware
No Drawing. Filed May 16, 1961, Ser. No. 110,341
12 Claims. (Cl. 260—45.7)

This invention relates to color-stabilized shaped articles and to a process for preparing such shaped articles from polyurethane compositions. More particularly, the invention relates to a process for preventing discoloration of spandex fibers upon exposure to oxides of nitrogen and other fumes.

It is known that spandex fibers on storage and upon exposure to atmospheric conditions are subject to acid fume discoloration which results in an undesirable yellowing of the fibers. While the discoloration may be offset to some extent by tinting or by the use of other masking agents, such materials often cause the fibers to display undesirable color characteristics since they merely mask and do not inhibit the formation of the yellow color.

It is, therefore, an object of the present invention to provide color-stabilized shaped articles of polyurethane compositions. It is a more particular object of this invention to provide spandex fibers which do not develop a yellow color upon exposure to oxides of nitrogen and other fumes. A further object of this invention is to provide a treating composition and process for treating spandex fibers which inhibit discoloration of the fibers upon exposure to fumes. These and other objects will become apparent from the following detailed description.

The objects of this invention are accomplished by providing spandex fibers having a stabilizing quantity of triarylphosphine incorporated therein. The amount of triarylphosphine may vary within a fairly wide range with amounts from a fraction of 1%, e.g. 0.5%, to about 15% or more by weight providing a stabilizing effect. The optimum quantity for a particular fiber will vary and for reasons of economy should, of course, be kept as low as possible. The selection of the optimum quantity will depend on a number of factors such as the particular type of spandex fiber, the fiber geometry, porosity, rheology, as well as the particle size of the triarylphosphine when applied from aqueous dispersions. Preferably, amounts from about 1% to about 5% by weight are utilized.

The term "spandex fiber" is used in its generic sense to mean a manufactured fiber in which at least 85% of the fiber-forming substance is a long chain synthetic segmented polyurethane. It is not intended, however, that the invention be limited to fibers of such segmented polyurethanes since the stabilization is achieved with other shaped articles such as films and the like. The segmented polyurethanes which provide spandex fibers contain the recurring linkage —OCONH—. The preferred spandex fibers are those prepared from segmented polyurethanes in which the urethane nitrogen is joined to an aromatic radical, which is further attached to a ureylene linkage —NHCONH—. Such polyurethanes appear to be most susceptible to the degradative action of acid fumes. Generally speaking, the segmented polyurethanes are prepared from hydroxyl-terminated prepolymers such as hydroxyl-terminated polyethers and polyesters of low molecular weight. Reaction of the prepolymer with a molar excess of organic diisocyanate, preferably an aromatic diisocyanate, produces an isocyanate-terminated polymeric intermediate which may then be chain extended with a difunctional active hydrogen-containing compound such as water, hydrazine, organic diamines, glycols, amino alcohols, etc.

Among the segmented polyurethanes of the spandex type are those described in several patents among which are U.S. Patents 2,929,800, 2,929,801, 2,929,802, 2,929,804, 2,953,839, 2,957,852, and Re. 24,689. As described in the aforementioned patents, the segmented polyurethane elastomers are comprised of amorphous segments derived from polymers having a melting point below about 50° C. and a molecular weight above about 600, and contain from about 5% to 40% of crystalline segments derived from a polymer having a melting point above about 200° C. in the fiber-forming molecular weight range. Most of such polyurethanes, when in filament form, have elongations greater than 150%, tensile recovery of over 90%, and a stress decay of less than 20%, as defined in U.S. 2,957,852.

The triarylphosphines utilized in the present invention are compounds having the formula

wherein $R_1$, $R_2$ and $R_3$ are hydrocarbon groups each of which is attached to the phosphorus atom through a carbon atom of an aromatic ring. The hydrocarbon groups may be the same or different, and the aromatic rings which are attached to the phosphorus atom may bear aliphatic, cycloaliphatic, or aromatic hydrocarbon substituents. The rings are otherwise free of substituents. Illustrative of the triarylphosphines are triphenylphosphine, tritolylphosphine, trixylylphosphine, trinaphthylphosphine, tri-p-biphenylylphosphine, and di-p-tolylphenylphoshine. Triphenylphosphine is preferred.

The triarylphosphine may be incorporated in the shaped article by various procedures. For example, it may be dissolved in a solution of the segmented polyurethane, and the solution may then be cast into a film in the conventional way. With fibers, better results are obtained by methods similar to those used for incorporating dyestuffs. For example, the triarylphosphine may be dissolved in a suitable organic solvent to which the fibers are inert, i.e. non-reactive, and the fibers immersed in the treating solution. Or the triarylphosphine may be dispersed in boiling water and applied to the fiber by passing it through a treating bath containing the dispersed triarylphosphine. In such "dipping" applications, the fiber is held in the bath for a period of time sufficient to insure that a stabilizing quantity of triarylphosphine is retained by the fiber upon being removed from the treating bath. The time may vary from a few seconds to an hour or more. The temperature of the bath is not critical and, of course, will vary, depending on the solvent or carrier utilized and the method of application used.

The spandex fibers may be treated alone or may be incorporated in fabrics with fibers of different compositions. While the treatment of fabrics containing other fibers as well as spandex fibers requires more of the treating agent, the other fibers are not adversely affected. Both natural and synthetic fibers, as well as blends thereof, may be included in the fabrics without impairing the stabilization of the spandex fibers.

A particularly advantageous method for applying the triarylphosphine to spandex fibers is to incorporate the triarylphosphine in the spin finish applied to the fiber immediately after extrusion. The oil-based finishes describes in co-pending application Ser. No. 18,264, now U.S. Patent No. 3,039,895, are especially desirable finishes for spandex fibers. As described therein, this type of finish is substantially anhydrous and consists of a textile oil with finely divided dispersed particles of a Group I, II, or III metal salt of a higher fatty acid. The triarylphosphines may be easily dissolved or dispersed in the textile oil, e.g., mineral oil, for application to the spandex fiber by this method.

This invention is also applicable to shaped articles other than fibers and films prepared, e.g. by molding, from segmented polyurethanes as hereinbefore defined. Additives, fillers, plasticizers and the like which are conventionally used with segmented polyurethanes may be used as desired with the triarylphosphine stabilizers.

The principal advantage attained by the present invention resides in providing spandex fibers which are stabilized against yellowing due to nitric fumes. A further advantage is the stabilization against discoloraton on exposure to chlorine. Additional advantages reside in the ease of application of the material and the substantial protection afforded by the stabilizer during normal use and care of fabrics containing the treated fibers.

In the following examples, which further illustrate this invention, the fume-fading tests are carried out according to AATCC Standard Test Method 23–1957, as described at pages 104–106 of The Technical Manual of the American Association of Textile Chemists and Colorists (1960).

The degree of yellowness, referred to in the examples as "$b$" value, is determined from colorimetric data obtained by analyzing continuous filament and fabric samples which are about three inches square. The reflectance ratios of the samples in the green and blue filter settings of a colorimeter are measured, using a Model IV Color Master Differential Colorimeter, manufactured by Manufacturing Engineering and Equipment Company, Hatboro, Pennsylvania, and calibrated against the manufacturer's standard reference plates and the National Bureau of Standards' certified reflectance plates. Three readings are taken on each of the samples, one of the measurements for the filament sample being made with the sample rotated 90° from the position of the first reading. The "$b$" values are then calculated from the average of three readings, using the following formula $$b = 42.34 G^{1/3} B^{1/3}$$

where G represents the reflectance ratio with the green filter and B represents the reflectance ratio with the blue filter.

*Example I*

A solution of segmented polyurethane containing approximately 20% solids in N,N-dimethyl formamide was prepared according to the procedure of Example I of copending application of Arvidson and Blake, U.S. Ser. No. 709,445, January 7, 1958, now U.S. Patent 2,999,839. To this solution was added a slurry of titanium dioxide in dimethyl formamide such that the final mixture contains 5% of titanium dioxide based on the polymeric solids. The poly-(N,N-diethyl-beta-aminoethyl methacrylate) of the aforesaid example was not added.

To a portion of the foregoing mixture there was added triphenylphosphine such that the mixture contained 5% of this additive based on the polymeric solids. Films were cast from the solutions which contained and were free of triphenylphosphine. After thorough drying, the films were measured for "$b$" value, according to the procedure described above. The two films were then subjected, for sixteen hours, to the fume-discoloration test described earlier. After this exposure, they were allowed to cool and were again measured for "$b$" value. Results were as follows:

| | "$b$" Values | |
|---|---|---|
| | As Prepared | After Fume Exposure |
| Sample With Triphenylphosphine | 2.1 | 3.1 |
| Control | 2.8 | 15.8 |

*Example II*

The polymer preparation of Example I was followed with the additional feature that the solution contained 5% titanium dioxide, 5% poly-(N,N-diethyl-beta-aminoethyl methacrylate), and 0.0125% ultramarine blue pigment, all based on segmented polyurethane. The mixture was spun as described in Example I of the abovementioned application of Arvidson and Blake to yield a 280-denier coalesced multifilament strand. To this coalesced multifilament was applied an oil-based finish as described in co-pending application of Yuk, U.S. Ser. No. 18,264, filed March 29, 1960. The finish consisted of 80% No. 50 mineral oil, 10% acetylated castor oil, 5% blown peanut oil, and 5% magnesium stearate. The resulting fiber contained about 12% of finish by weight.

A skein of this fiber weighing 7.3 grams was soaked for 1 minute in 100 ml. of a 3 weight percent solution of triphenylphosphine in acetone. After drying, the treated skein and a similar skein treated with acetone containing no triphenylphosphine were measured for "$b$" value and then subjected to the fume-discoloration test for sixteen hours. The data obtained were as follows:

| | "$b$" Values | |
|---|---|---|
| Percent Triphenylphosphine Added | As Prepared | After Fume Exposure |
| 12 | 2.6 | 4.3 |
| 0 | 1.5 | 13.3 |

*Example III*

About 5% of triphenylphosphine was added to the oil-based finish described in Example II above which was then applied to a freshly spun sample of the coalesced multifilament strand described in that example. Without further treatment, samples of this product were measured for "$b$" value and subjected to the fume-discoloration test for the periods indicated below with the following results:

| | "$b$" Values | | |
|---|---|---|---|
| Percent Triphenylphosphine Added | As Prepared | 16-Hour Exposure | 32-Hour Exposure |
| 0.6 | −1.1 | 4.0 | 7.6 |
| 0 | −0.6 | 11.1 | 14.7 |

*Example IV*

Fibers were prepared as in Example II except that the titanium dioxide, poly-(N,N-diethyl-beta-aminoethyl methacrylate) and the blue pigment were omitted from the spinning solution. A seven-gram skein of these fibers was dipped for one minute in 100 cc. of acetone containing two grams of triphenylphosphine. A 6–7% pick-up of triphenylphosphine was indicated by the difference in weight between the dried skein before and after the treatment in the triphenylphosphine/acetone solution. A similar skein was dipped in acetone in absence of triphenylphosphine. In each instance the skeins were dried in air and their color was measured in terms of "$b$" value.

They were then subjected to the 16-hour fume discoloration test, cooled to room temperature, and again measured for "b" value. The results were as follows:

|  | "b" Values | |
| --- | --- | --- |
|  | As Prepared | After Fume Exposure |
| Sample with Triphenylphosphine | 0 | 2.2 |
| Control | 4.4 | 30.4 |

*Example V*

An aqueous application bath was prepared by adding to 500 ml. of water 0.25 gram of the sodium salt of the condensation product of naphthalene sulfonic acids and formaldehyde, 0.13 gram of a sodium sulfate ester of ethylene oxide and long chain ($C_{16}$–$C_{18}$) unsaturated alcohol condensate, and 0.24 gram of triphenylphosphine. To this bath at 70–80° C. was added a seven-gram skein of fibers prepared as described in Example II. The skein was moved about in the bath occasionally. After sixty minutes at the above recited temperature, the skein was removed, rinsed with cold water, and dried thoroughly. A second skein was prepared and treated in the same way except that triphenylphosphine was omitted from the bath. The color of the dry skeins was measured in terms of "b" value, and they were then placed in the fume testing oven for sixteen hours, removed, cooled to room temperature, and again measured for color. The results were as follows:

|  | "b" Values | |
| --- | --- | --- |
|  | As Prepared | After Fume Exposure |
| Sample with Triphenylphosphine | 1.1 | 2.0 |
| Control | 1.4 | 17.6 |

*Example VI*

Fibers were prepared as described in Example II. A skein of the fiber, weighing 6.72 grams, was soaked for one minute in 100 ml. of a 2% by weight solution of triphenylphosphine in acetone. Approximately 7% pickup of triphenylphosphine was indicated by the difference in weight between the dried treated and untreated skeins. After drying, the treated skein and a similar skein dipped in acetone only were measured for color in terms of "b" value and then exposed to chlorine by immersing each skein in 400 ml. of an aqueous solution containing 200 parts per million active chlorine at 65° C. The skein was moved about in the bath occasionally and after twenty minutes at the recited temperature the skein was removed from the aqueous solution, rinsed with cold water, and dried thoroughly and again measured for color. The results were as follows:

|  | "b" Values | |
| --- | --- | --- |
|  | As Prepared | After Chlorine Exposure |
| Sample with Triphenylphosphine | 1.0 | 4.2 |
| Control | 1.9 | 25.1 |

As many widely different embodiments of this invention may be made without departing from the spirit and scope thereof, it is to be understood that this invention is not to be limited to the specific embodiments thereof except as defined in the appended claims.

We claim:
1. A shaped article of a long-chain synthetic elastomer comprised of at least 85% of a segmented polyurethane prepared from an organic diisocyanate and a member selected from the group consisting of polyethers and polyesters, stabilized against acid fume discoloration by the presence therein of a stabilizing quantity of a triarylphosphine having the formula

wherein $R_1$, $R_2$ and $R_3$ are hydrocarbon groups each of which is attached to the phosphorus atom through a carbon atom of an aromatic ring.

2. The shaped article of claim 1 wherein said hydrocarbon groups are phenyl groups.

3. The shaped article of claim 1 wherein said polyurethane is a hydrazine chain extended polyurethane.

4. The shaped article of claim 3 wherein the triarylphosphine is present in an amount up to about 15% by weight of said shaped article.

5. The shaped article of claim 4 wherein the triarylphosphine is present in an amount from about 1% to about 5% by weight of said shaped article.

6. A shaped article prepared from a long chain fiber-forming synthetic polyurethane prepared from an organic diisocyanate and a member selected from the group consisting of polyethers and polyesters stabilized against acid fume discoloration by having incorporated therein a stabilizing quantity of a triarylphosphine having the formula

wherein $R_1$, $R_2$ and $R_3$ are hydrocarbon groups each of which is attached to the phosphorus atom through a carbon atom of an aromatic ring.

7. The shaped article of claim 6 wherein said hydrocarbon groups are phenyl groups.

8. The process of claim 10 in which said articles are fibers and wherein said treating composition is applied to said fibers by immersing said fibers in a treating bath containing said triarylphosphine for a period of time sufficient to provide from about 1% to 15% by weight of said triarylphosphine on said fibers.

9. The process of claim 8 wherein said triarylphosphine is triphenylphosphine.

10. The process of acid fume stabilizing shaped articles of a long-chain synthetic elastomer comprised of at least 85% of segmented polyurethane, prepared from an organic diisocyanate and a member selected from the group consisting of polyethers and polyesters, which comprises dipping said shaped articles into a treating composition containing triarylphosphine having the formula

wherein $R_1$, $R_2$ and $R_3$ are hydrocarbon groups each of which is attached to the phosphorus atom through a carbon atom of an aromatic ring for a period of time sufficient to provide a stabilizing quantity of said triarylphosphine on said articles, and thereafter drying said articles.

11. The process of acid fume stabilizing a polyurethane shaped article which comprises mixing into an organic solvent solution of a fiber-forming long-chain synthetic segmented polyurethane, prepared from an organic diisocyanate and a member selected from the group consisting of polyethers and polyesters, a stabilizing amount of a triarylphosphine having the formula

wherein $R_1$, $R_2$ and $R_3$ are hydrocarbon groups each of which is attached to the phosphorus atom through a carbon atom of an aromatic ring and thereafter extruding said solution through an orifice to form said shaped article.

12. The process of claim 11 wherein said hydrocarbon groups are phenyl groups.

References Cited by the Examiner

UNITED STATES PATENTS

| 2,364,394 | 12/1944 | Sibley | 260—761 |
| 2,676,122 | 4/1954 | McCarthy | 117—139.5 |
| 2,683,101 | 7/1954 | Riley et al. | 117—139.5 |
| 2,811,497 | 10/1957 | Ham | 117—161 |
| 3,009,762 | 11/1961 | Kohrn et al. | 18—54 |
| 3,047,356 | 7/1962 | Polansky | 19—54 |
| 3,072,605 | 1/1963 | Rogers et al. | 260—45.95 |
| 3,078,248 | 2/1963 | Ben | 260—30.6 |

FOREIGN PATENTS 516,306  9/1955  Canada.

LEON J. BERCOVITZ, *Primary Examiner.*

R. D. NEVINS, *Examiner.*

UNITED STATES PATENT OFFICE

CERTIFICATE OF CORRECTION

Patent No. 3,230,193            January 18, 1966

Gordon M. Moulds et al.

It is certified that error appears in the above identified patent and that said Letters Patent are hereby corrected as shown below:

Column 3, line 41, "Manufacturing Engineering and Equipment Company" should read -- Manufacturers Engineering and Equipment Corporation --; line 50, $b=42.34G^{1/3}B^{1/3}$ should read $b=42.34(G^{1/3}-B^{1/3})$ Signed and sealed this 2nd day of September 1969.

(SEAL)
Attest:

Edward M. Fletcher, Jr.

Attesting Officer

WILLIAM E. SCHUYLER, JR.

Commissioner of Patents